United States Patent
Nguyen et al.

(10) Patent No.: US 7,430,736 B2
(45) Date of Patent: Sep. 30, 2008

(54) DOWNLOAD AND INSTALLATION OF SOFTWARE FROM A NETWORK PRINTER

(75) Inventors: Truc D. Nguyen, San Diego, CA (US); Silvy J. Wilson, Aliso Viejo, CA (US)

(73) Assignee: Toshiba Tec Kabushiki Kaisha (JP)

( * ) Notice: Subject to any disclaimer, the term of this patent is extended or adjusted under 35 U.S.C. 154(b) by 328 days.

(21) Appl. No.: 09/970,134

(22) Filed: Oct. 3, 2001

(65) Prior Publication Data

US 2003/0066066 A1    Apr. 3, 2003

(51) Int. Cl.
G06F 9/445 (2006.01)
G06F 15/177 (2006.01)

(52) U.S. Cl. .................. 717/176; 717/171; 709/220

(58) Field of Classification Search ............... 717/178, 717/174, 175, 176, 177
See application file for complete search history.

(56) References Cited

U.S. PATENT DOCUMENTS

| | | | |
|---|---|---|---|
| 5,379,382 A | 1/1995 | Work et al. | |
| 5,580,177 A | 12/1996 | Gase et al. | |
| 5,596,694 A | 1/1997 | Capps | |
| 5,640,592 A | 6/1997 | Rao | |
| 5,815,722 A * | 9/1998 | Kalwitz et al. | 717/178 |
| 5,905,906 A | 5/1999 | Goffinet et al. | |
| 5,960,167 A | 9/1999 | Roberts et al. | |
| 6,009,480 A * | 12/1999 | Pleso | 710/8 |
| 6,023,585 A * | 2/2000 | Perlman et al. | 717/178 |
| 6,025,925 A | 2/2000 | Davidson, Jr. et al. | |
| 6,041,183 A | 3/2000 | Hayafune et al. | |
| 6,067,582 A | 5/2000 | Smith et al. | |
| 6,091,508 A | 7/2000 | Love et al. | |
| 6,094,548 A | 7/2000 | Gunning et al. | |
| 6,199,204 B1 | 3/2001 | Donohue | |
| 6,201,611 B1 | 3/2001 | Carter et al. | |
| 6,202,207 B1 | 3/2001 | Donohue | |
| 6,256,668 B1 * | 7/2001 | Slivka et al. | 709/220 |
| 6,266,809 B1 | 7/2001 | Craig et al. | |
| 6,266,810 B1 | 7/2001 | Tanaka et al. | |
| 6,269,480 B1 | 7/2001 | Curtis | |
| 6,269,481 B1 | 7/2001 | Perlman et al. | |
| 6,272,677 B1 | 8/2001 | Lam et al. | |
| 6,594,690 B2 * | 7/2003 | Cantwell | 709/217 |
| 6,671,749 B2 * | 12/2003 | Williams et al. | 710/10 |
| 6,681,392 B1 * | 1/2004 | Henry et al. | 717/176 |
| 2003/0048473 A1* | 3/2003 | Rosen | 358/1.15 |

* cited by examiner

Primary Examiner—Tuan Q. Dam
Assistant Examiner—Michael J Yigdall
(74) Attorney, Agent, or Firm—Tucker Ellis & West LLP (57) ABSTRACT

An architecture for providing device software from a network peripheral device to a client machine. An end-user of a client machine connected to the network accesses the network peripheral device having the device software stored therein. In response thereto, the network peripheral device notifies the end-user that device software is available for download. The end-user then manually selects and downloads one or more components of the device software from the network peripheral device for subsequent installation on the client machine.

30 Claims, 5 Drawing Sheets

DOWNLOAD AND INSTALLATION OF SOFTWARE FROM A NETWORK PRINTER

BACKGROUND OF THE INVENTION

This invention is related to printer software installation, and more specifically to methods of downloading and installing such drivers and related utilities.

A printer (also designated a printer controller hereinafter) is usually shipped with printer drivers that allow users to print from application software. More recently, printer driver software has been commonly distributed on CD-ROM ("CD") media. In some cases, a variety of drivers are provided on a single CD, however, that is the exception, such that different printer controllers typically require driver distributions on a different printer driver CD. The many versions of printer drivers are also updated periodically to fix bugs and improve performance, and such updates preclude installation by the original installation CD. To facilitate driver installs in larger networked environments, the printer driver CD needs to be duplicated and distributed to the users, who then install the drivers on their computers. Subsequent updates similarly require further creation of distribution CD's that will need to be duplicated and redistributed to provide the updates to the users in an expeditious manner. For those user computers that do not have a CD drive, the network administrator is required to accommodate such limitations by utilizing other forms of media distribution to ensure that all users can benefit from the updated drivers. Further, those users who had already installed a printer driver, and now require an updated driver patch, would require that the administrator install the patch.

What is needed is a less resource-intensive method for distributing printer drivers and related software in networked environments.

SUMMARY OF THE INVENTION

The present invention disclosed and claimed herein, in one aspect thereof, comprises an architecture for providing device software from a network peripheral device to a client machine. An end-user of a client machine connected to the network accesses the network peripheral device having the device software stored therein. In response thereto, the network peripheral device notifies the end-user that device software is available for download. The end-user then manually selects and downloads one or more components of the device software from the network peripheral device for subsequent installation on the client machine.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The disclosed invention solves this problem by providing a method and apparatus for an end-user to download and install the printer driver(s) and/or utility software directly from the network printer whenever the user is required to do so. In preparation thereof, a network administrator uploads to the network printer one or more of the device drivers and associated utility software such that the end-user of the client machine can facilitate the download. The disclosed process is suitably used for a first-time install and for subsequent installations of printer drivers, updates and/or related utility software. When the end-user selects the network printer (or network device) for use, the end-user will be automatically prompted to download and install the latest drivers and/or utility software. The end-user can then select which of the drivers and/or utility software to download and install. Note that the driver and utility software need not be the latest version. For example, where a driver release has been provided, but over time proven to be "buggy," the administrator can notify its end-user clients to downgrade to an earlier and more stable version by connecting to the associated network printer and executing the install process by selecting the earlier version.

One aspect of the disclosed method is that extra utilities, for example, document monitoring utilities and fonts, are also suitably downloaded and installed at the same time by the end-user of the client machine. Another aspect is that all components are suitably selected from a menu such that it is easier for the end-user to follow than conventional multiple Setup programs on CD distributions, or large file downloads from a local or remote site that are automatically executed once downloaded. The disclosed process is also suitably implemented as a step-by-step protocol between the end-user and network printer via, for example, a web browser, or other conventional user interface. Furthermore, as the patches, upgrades and/or software utilities are made available and uploaded to the network printer, control logic of the network printer is suitably made to communicate with the client software such that the end-user is now able to be "forced" to install the update as a prerequisite to using the printer, whereas conventional architectures did not alert the user to the availability of a new update.

Note that this particular embodiment discloses a network printer having such capabilities, however, it is appreciated that many network devices can be made operable with the disclosed architecture. For example, such network devices include, but are not limited to, the following: a network facsimile machine; high-end network copiers having numerous programmable features; multi-function machines that include functions such as copying, scanning, printing, and faxing; and network modems accessible by a client over a network.

Figure 1:
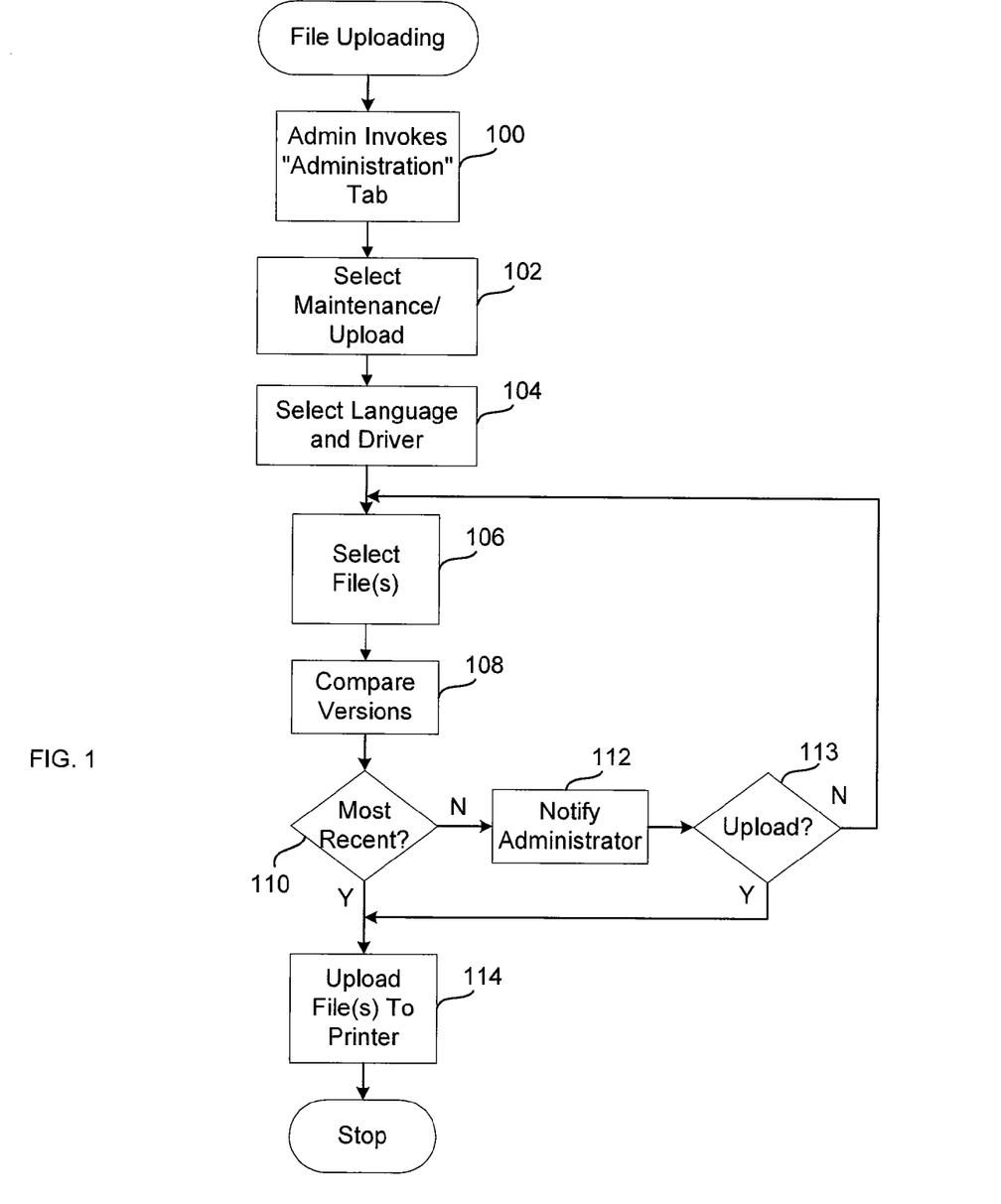
FIG. 1 illustrates a flow chart of a method of uploading printer driver and utility software information to a network printer by an administrative user.

Referring now to FIG. 1, there is illustrated a flow chart of a method of uploading printer driver and utility software information to a network printer by an administrative user (i.e., hereinafter called an "administrator" or other user with similar access rights). To facilitate the uploading process, the administrator launches a program that provides a user interface (e.g., a graphical user interface ("GUI")), and communicates with a corresponding printer control logic of one or more of the networked printers (or devices). Such a program may be the same program resident on an end-user client computer to facilitate download of the software (and which will be discussed in greater detail hereinbelow). The administrator can then invoke a log-in process whereby a username and password are required to provide administrative rights for uploading of the software from the administrative computer, any client machine disposed on the network, or any remote node that can connect to the network. The administrative interface then presents the administrator with options for selecting and uploading the desired printer drivers and utility software to the network printer. The selected software is then transmitted to a storage device (e.g., a hard disk drive) internal or external to the printer for storage and accessing. Note that the storage device is suitably also a non-volatile memory such as static RAM or any variety of programmable read-only memory (PROM) having sufficient speed and capacity to maintain and process the uploaded software.

In more robust implementations, the printer control logic launches the GUI from the associated storage device and presents an administrative window to the administrator in response to the administrator login process. In one embodiment, the GUI may include an "Administration" tab that the administrator selects, as indicated in a function block 100. In response to selection of the Administration tab, the GUI presents another information page to which the tab is linked such that the administrator can then select Maintenance and Upload options, as indicated in a function block 102.

The GUI provides access to the contents of the software CD whereby the administrator is presented with a listing of the one or more files (e.g., language, utility, and driver files) for uploading to the printer, as indicated in a function block 104. The administrator should have then inserted the distribution media (e.g., a CD into a CD drive) into the appropriate distribution peripheral at this time such that the appropriate driver and utility software information can be accessed and uploaded to the network printer. Note that depending upon the particular distribution media of the drivers and utility software, the administrator can upload the software from any network computer or peripheral server having a compatible media peripheral. For example, if the distribution media is a CD, the administrator can upload the software from a networked client machine having a CD drive and disposed on the network, or by placing the CD into a networked CD jukebox system whereby the administrator is provided sufficient rights to access that system remotely from a client machine to facilitate uploading of the desired drivers therefrom. In such a scenario, an administrator who may be at a distant geographical location of the network can call an assistant at another distant location to have the media placed into an appropriate networked media peripheral or computer. The administrator can then access the media peripheral or computer remotely to facilitate uploading of the files to the printer.

In any case, flow is then to a function block 106 where the files are presented to the administrator such that the administrator selects one or more files for uploading to the printer. Flow is then to a function block 108 where the files selected for upload are compared with existing files stored on the printer. This is can be made an optional step in that the administrator would have presented to him or her a listing of all the available drivers and software currently residing on the storage device of the printer. Alternatively, the existing drivers and/or utility software on the storage unit could be simply overwritten with the most recent files. However, this feature precludes the possibility of "downgrading" to an earlier version of software when a "buggy" version has been released by the manufacturer of the printer.

If a file selected for upload is not the most recent, as indicated by a check performed in a decision block 110, flow is out the "N" path to a function block 112 where the administrator is notified, and the file can be bypassed for upload, if desired. Flow continues to a decision block 113 where the administrator can then optionally select the file for upload. If so, flow is out the "Y" path to a function block 114 to upload the file. If not, flow is out the "N" path of decision block 113 back to the input of function block 106 to make another file selection. On the other hand, if the file(s) selected for upload are the most recent, flow is out the "Y" path of decision block 110 to the function block 114 to upload the file(s) to the network printer. The upload process then reaches a Stop point.

Alternatively, it is appreciated that the user interface is designed such that a group of files can be selected for upload wherein the most-recent-version process automatically checks each file and reports back the results to the administrator as each file is being processed for upload. Further, only the most-recent files would then be automatically uploaded, as indicated in a function block 114, while the rejected files would not be uploaded.

It is also appreciated that the GUI can be designed such that where a company network has several of the same type and model of printer requiring the same drivers and/or utilities for uploading, a plurality of the networked printers can be selected from a menu for receiving the uploads in a substantially simultaneous manner. This precludes the administrator from having to login separately to each network printer to initiate the upload process.

Figure 2:
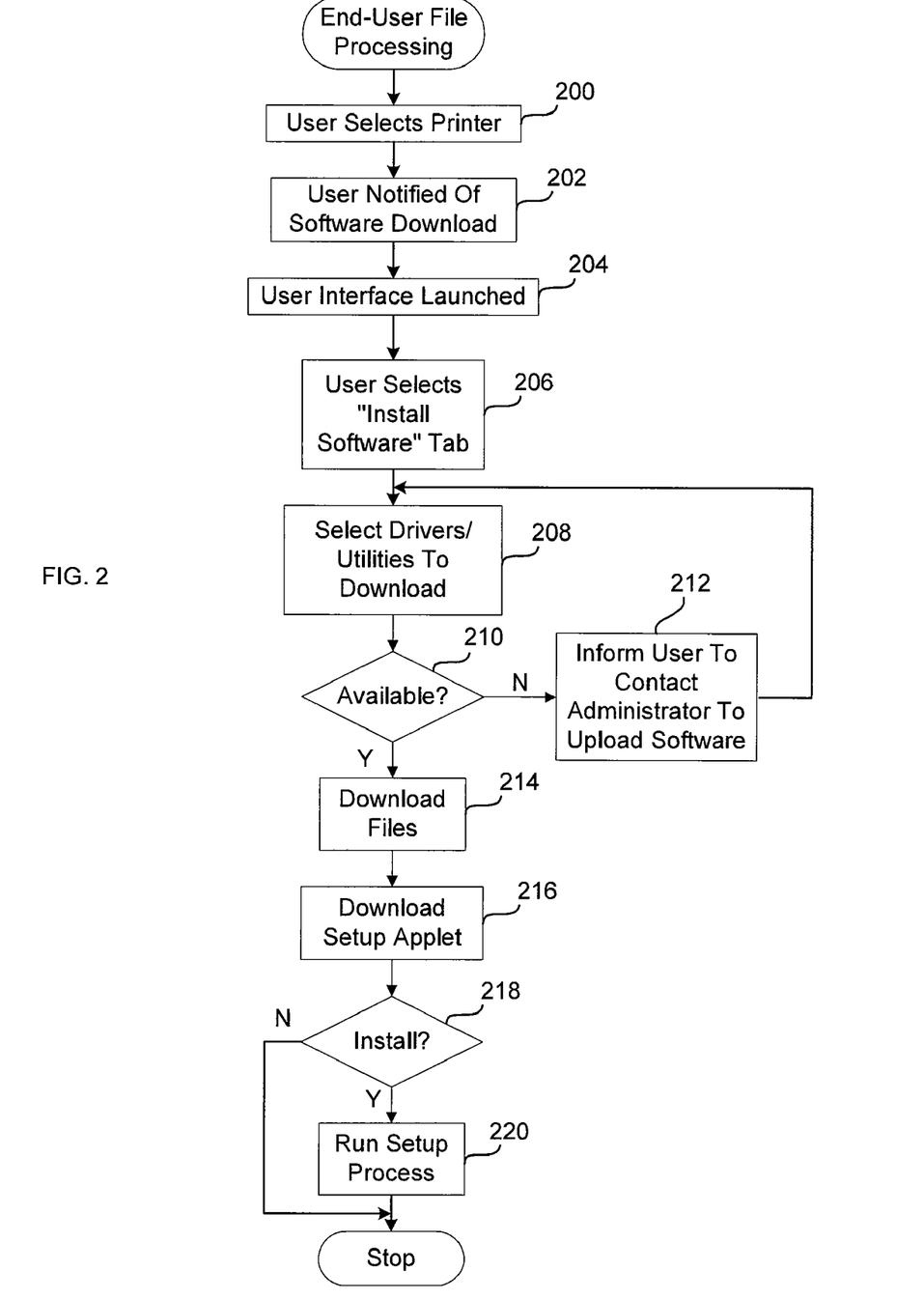
FIG. 2 illustrates a flow chart of a method for downloading the printer driver and utility files from the printer by an end-user.

Referring now to FIG. 2, there is illustrated a flow chart of a method for downloading the printer driver and utility files from the printer by an end-user. When the end-user desires to use the network printer, a connection request to the printer is initiated by sending a print job to the printer. The request is initiated in response to the end-user invoking a print command or option after the network printer is selected as in conventional implementations such that the name of the printer is made available in, for example, a print window presented to the end-user, as indicated in a function block 200. Flow is then to a function block 202 where in response to the print request, data is then communicated over the network from the network printer to the client machine causing the end-user to be notified of the availability of device software related to the network printer.

Notification to the end-user can be initiated in a number of ways. For example, a user interface is automatically launched and presents the notification to the end-user, as indicated in a function block 204. It is appreciated that the control logic on the network printer can launch and present the user interface from its local mass storage device to the client machine such that the end-user utilizes the user interface to selectively download one or more of the available software. Alternatively, the control logic of the printer can communicate data to the client machine that causes a program to launch the user interface from the client machine to facilitate selection of the one or more pieces of software for download. In a further alternative, as noted hereinabove, the administrator notifies the end-user of the availability of the software on the network printer by, for example, an e-mail notification sent to all users after the administrator has uploaded the updated software to the printer.

Flow is to a function block 206 where the user interface screen presents navigation tools comprising, for example, an "Install Software" tab that the end-user can then select to navigate to an appropriate screen to begin the file-selection process. The end-user then selects for download the appropriate drivers and/or utility files, as indicated in a function block 208. As mentioned hereinabove, the program can be implemented to require a login-process such that the end-user must enter a user ID and password to access the download capabilities provided by the user interface. Either before or after a login process, the end-user selects the network printer from which to download the software. The printer is suitably identified by any number of conventional methods, for example, the printer can be given an alias name (e.g., Laser-Man) that provides a more intuitive naming format to the end-user than IP address octets more familiar to a network technician. The alias name is associated with a specific network address such that the user need only select the printer name from a menu of printers on the network.

Flow is then to a decision block 210 to determine if the files are available. If the files are not available, flow is out the "N" path to a function block 212 where the end-user informs the administrator of the unavailability of the file(s). It is appreciated that even files that appear in the list for selection by the end-user, and have been uploaded by the administrator to the storage unit of the network printer, may have been misplaced on the drive or have become corrupted such that download is prevented or results in an error message to the end-user. The control logic can suitably inform the end-user of the file error, and the end-user can pass the error information on to the administrator.

It is also to be appreciated that the information presented to an end-user regarding a file name would not need to be the raw file name (e.g., pntfl34v6.exe) normally provided by the vendor, but would be informative text that more clearly describes the file that the user wants to download. The user would then select the text field associated with the file, which text field would then be linked to the actual file to be downloaded. If the file(s) cannot be downloaded due to an error, and the error has been communicated, flow is from function block 212 back to the input of function block 208 to prompt the user to make other file selections.

If the file(s) are available for download, flow is out the "Y" path of decision block 210 to a function block 214 to initiate downloading of the file(s). Flow continues to a function block 216 to further download a setup applet for facilitating automatic setup of the one or more files that are downloaded. Once the files and applet have been downloaded, the end-user is then prompted, as indicated in a decision block 218, whether to initiate the install process. If so desired, flow is out the "Y" path to a function block 220 to initiate installation of the device software on the client computer. When the user initiates the installation process, the small Setup applet executes to guide the user through the setup process. After file installation has completed, flow is to a Stop point.

Alternatively, if the end-user wishes to install the downloaded files at a later time, flow is out the "N" path of decision block 218 to bypass the install process, and to arrive at the Stop point.

Note that the installation process can occur automatically such that installation occurs while the user is connected to the printer. Alternatively, the desired files can be downloaded to the end-user computer where the end-user manually initiates installing from the client machine.

Figure 3:
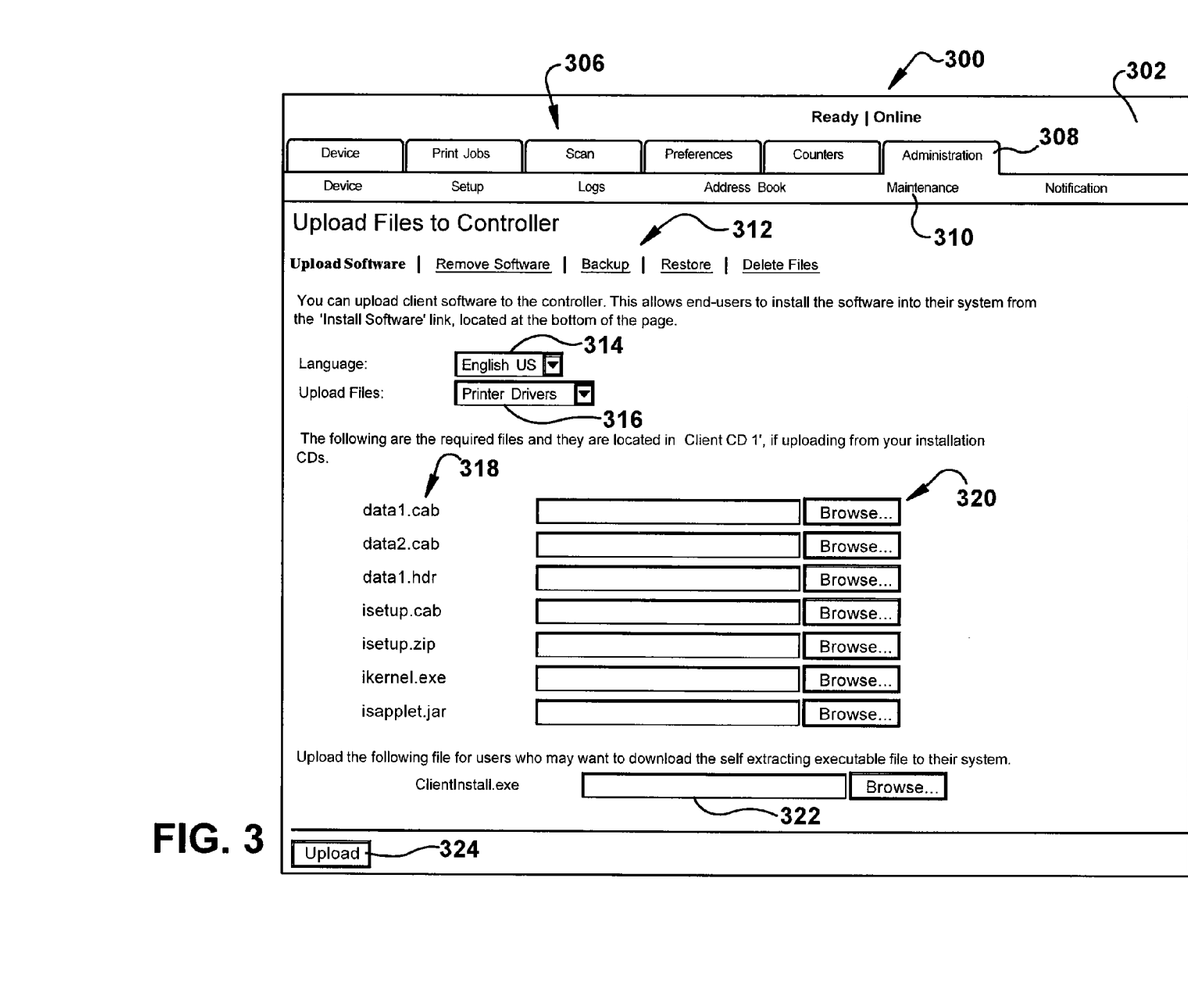
FIG. 3 illustrates a user interface for uploading one or more drivers and related information to a central network-based distribution site in accordance with the flow chart of FIG. 1.

Referring now to FIG. 3, there is illustrated a user interface 300 for uploading one or more drivers and related information to a central network-based distribution site in accordance with the flow chart of FIG. 1. The user interface 300 can be developed using any conventional programming tool. In this particular embodiment, the interface 300 provides an information page 302 configured for use by the administrator for facilitating uploading of the one or more drivers, updated drivers, and utilities which may be needed for installation by network clients to access features of the various network printers or devices. In this particular embodiment, the information page 302 provides a tabbing environment 306 whereby the administrator selects an Administration tab 308 to present various administrative options, such as Device, Setup, Logs, Address Book, Maintenance, and Notification. By further selecting the Maintenance option 310, the administrator is presented file maintenance options 312, including respective windows to Upload Software, Remove Software, Backup files, Restore files, and Delete files. The Upload Software window provides a Language field 314 for selecting the language of the file to be uploaded from a drop-down menu (indicated by the down-arrow graphic). An Upload Files field 316 allows the administrator to select the type of file to be uploaded. For example, the associated drop-down menu may include a variety of printer drivers, utility files, and any other file types deemed necessary for download by a client to obtain the desired benefits of a networked device.

Note that as mentioned hereinabove, the disclosed architecture is not limited to network printers, per se, but suitably accommodates manual selection and download of corresponding peripheral software for any network peripheral device so configured. For example, a multi-function device offering fax, scanning, copying, and printing functions bundled into one networkable piece of equipment may benefit from the disclosed architecture. In an alternative embodiment, the network device is a piece of test equipment such that a user wanting to access the embedded capabilities of the test equipment can access it to download the device software in order to obtain benefit from the embedded functions of the test equipment.

The Upload Software window also includes a list of standard files 318 required for an update process of a particular printer model. In this embodiment, seven files are listed: data1.cab, data2.cab, data1.hdr, isetup.cab, isetup.zip, ikernel.exe, and isapplet.jar. To the right of the listed files 318 are file location fields 320 and associated BROWSE buttons that allow the administrator to browse the distribution media and insert the path to the location on the distribution media of the listed files 318. The Upload Software window also has client install field 322 and associated BROWSE button such that the administrator can point the software to the location of the most recent client install software located on the distribution media. The client install software is that file that the end-user would download to facilitate installation of the downloaded software files on the client computer. Once the administrator has enabled the interface software to find the file locations on the distribution media via the Upload Software window, he or she then selects an Upload button 324 to initiate uploading of the selected files to the print controller of the network printer. When the upload is complete, the administrator then exits out of the interface program.

Figure 4:
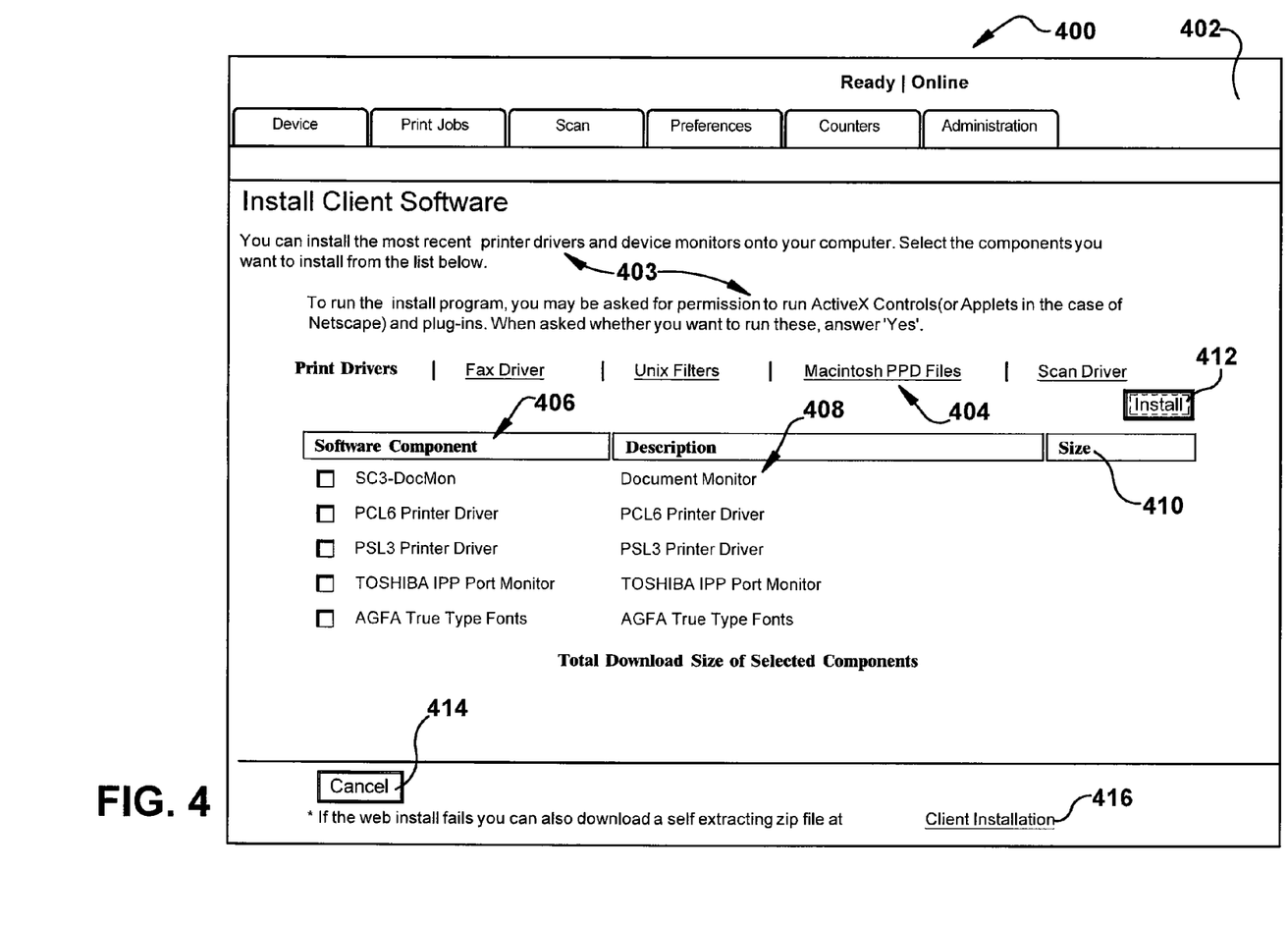
FIG. 4 illustrates a user interface for downloading and installing one or more drivers and related information from the network printer, in accordance with the flow chart of FIG. 2.

Referring now to FIG. 4, there is illustrated a user interface 400 for downloading and installing one or more drivers and related information from the network printer. The end-user launches a program that functions as the user interface 400 presenting a client install window 402. By default, the client install window 402 for print drivers can be made to appear. As mentioned hereinabove, the number and types of files offered for download to the end-user, in accordance with the disclosed invention, is not limited network printers, but other network devices, as well. As illustrated, the install window 402 also provides informational text 403 to inform the user of basic information, and optional links 404 that the end-user can select in order to download files for other peripherals, for example, a scanner, and facsimile machine. The optional links 404 also provide download capabilities for software related to specific types of computer platforms, e.g., Unix, and Macintosh.

The client install window 402 provides a file field 406 where the end-user selects different files for download. A corresponding description field 408 provides a brief description of the files offered for download. In this particular embodiment, the client install window 402 also provides a Size field 410 such that the end-user can see the size of the files selected for download. When ready to download the files, the end-user then selects an Install button 412. Should the end-user choose to abort the install, he or she may select a Cancel button 414. Furthermore, if the download and installation process fails, the end-user can select an alternate file download 416 that facilitates installation via a bundled executable file having all the available driver and utility files contained therein.

Figure 5:
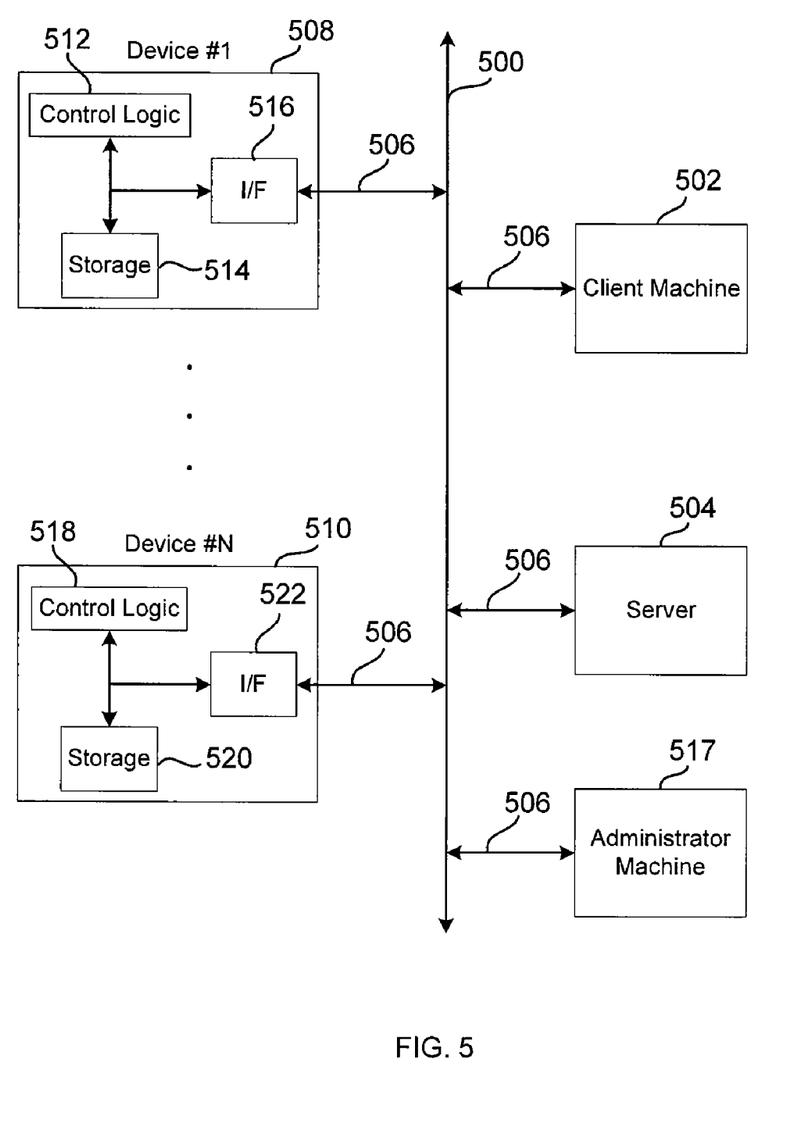
FIG. 5 illustrates a network having one or more network devices accessible and operable to provide software downloading to one or more client machines.

Referring now to FIG. 5, there is illustrated a network having one or more accessible network devices that are operable in accordance with the present invention to provide software downloading to one or more client machines. The network 500 is suitably any conventional network, including, but not limited to, wired topologies and packet-switched architectures such as Ethernet and Token Ring, wireless networks utilizing air protocols, and free space optical architectures utilizing, for example, laser and infrared technologies. Network connections 506 can be any conventional connectivity solution, as mentioned hereinabove.

The network 500 has disposed thereon an end-user client computer 502 for utilizing services from a server 504 also disposed on the network 500. Note that any number of client computers 502 and servers 504 can be connected to the network 500, as is typical of a network 500. Additionally, one or more network Devices 1-N (denoted as items 508 through 510) embodying the disclosed software upload/download aspects are suitably connected to the network 500 to provide services to the client computer 502 of the end-user. Continuing with the embodiment of the network device 508 being a network printer, the printer 508 comprises control logic 512 for controlling onboard functions for the printer 508. The control logic 512 connects to a storage unit 514 associated with the printer 508 to control the storing of files uploaded to the printer 508 by the administrator, and the downloading of files from the printer 508. The printer 508 also comprises a network interface 516 to handle communications between the device control logic 512 and the client computer 502 seeking to download the software files. The network interface 516 suitably communicates through the network 500 to an administrator computer 517 receiving files. The administrator computer 517 provides the mechanism wherein the administrator performs routine file maintenance on the storage unit 514 of the network printer 508, e.g., deleting files no longer required, moving files to different locations, editing software that facilitates storing and retrieval of the device software to the clients, etc. In this particular embodiment, the network printer control logic 512 executes embedded Windows NT® to control all onboard functions and to communicate with external nodes.

The network printer 510 (similar to printer 508 in all aspects) comprises control logic 518 for controlling onboard functions for the printer 510. The control logic 518 connects to a storage unit 520 (internal, in this case) associated with the printer 510 to control the storing of files uploaded to the printer 510 by the administrator, and the downloading of files from the printer 510. The printer 510 also comprises a network interface 522 to handle communications between the device controller 518 and the client computer 502 seeking to download the software files, and the administrator computer 517 for uploading the files thereto.

Utilizing the disclosed invention, the end-user now has the capability to selectively download only a single driver file, associated utility software, or other files offered, individually for download. Conventional implementations typically offer such software via a large bundled executable file that can require substantial bandwidth and extended download times from the device vendor. Furthermore, local area networks exist wherein not all end-users are provided access to the device vendor in order to obtain the latest driver and/or utility software updates. Thus the administrator, by uploading such software to the local network device, can now offer such updates to all users, whether or not the users are capable of accessing an outside remote network on which the vendor server is disposed.

Although the preferred embodiment has been described in detail, it should be understood that various changes, substitutions, and alterations could be made therein without departing from the spirit and scope of the invention as defined by the appended claims.

What is claimed is:

1. A system for network-based uploading of drivers for document processing devices comprising:

means adapted for selectively receiving into a memory means integrated with a document processing controller, a plurality of alternative software drivers for use with associated workstations in data communication with a document processing device means associated with the controller;

the memory means including means adapted for storing at least one executable software installation utility, the at least one executable software installation utility corresponding to at least one of the plurality of software drivers;

rendering request means adapted for receiving a document rendering request from at least one of the associated workstations, the document rendering request including commencement of a transfer of an associated electronic document from the at least one workstation to the document processing device;

means adapted for determining a presence of a plurality of software drivers disposed in the memory means of the controller that correspond to a received document rendering request, which plurality of software drivers are associated with different operating systems;

graphical user interface generation means including means adapted for generating, via the controller, a graphical user interface on the associated workstations in accordance with a determined presence of a plurality of software drivers, which graphical user interface includes a list of each of the plurality of available software drivers stored in the memory transmitted from the document processing controller;

means adapted for receiving user input, via the graphical user interface, which user input includes operating system data representative of an operating system type on the at least one associated workstation;

input means adapted for receiving user input, via the graphical user interface, which user input selectively directs loading of the at least one of the plurality of software drivers to a storage area on the associated workstation in accordance with received operating system data;

means adapted for identifying at least one stored executable software installation utility stored in the memory means which corresponds to the at least one of the plurality of software drivers corresponding to received user input;

means adapted for commencing, in accordance with user input, a transfer of software from the memory to the storage area via a data communication session initiated via the graphical user interface in accordance with a selection completed via the input means, the software including at least one of the plurality of software drivers and at least one identified executable software installation utility corresponding to the at least one of the plurality of software drivers; and means adapted for commencing operation of the at least one identified executable software installation utility on the associated workstation after a transfer thereof to the storage area so as to install the at least one of the plurality of software drivers thereon.

2. The system for network-based uploading of drivers for document processing devices of claim 1 wherein:

the graphical user interface generation means further includes means adapted for generating a graphical user interface on the associated workstations, which graphical user interface includes data representative of an alternative software driver to the at least one of the plurality of available software drivers, which alternative software driver is stored in the memory; and the input means includes means adapted for receiving user input, via the graphical user interface, which user inputs selectively directs loading of the alternative software driver to a storage area on the associated workstation.

3. The system for network-based uploading of drivers for document processing devices of claim 2 wherein the alternative software driver is one that was previously loaded on the software workstation so as to facilitate selective rollback to an earlier driver version.

4. The system for network-based uploading of drivers for document processing devices of claim 1 further comprising means adapted for initiating generation of the user interface upon a loading of the at least one of the plurality of available software drivers into the memory associated with the document processing controller.

5. The system for network-based uploading of drivers for document processing devices of claim 1, wherein the document processing device includes a printing device, and wherein the software driver is comprised of a printer driver.

6. The system for network-based uploading of drivers for document processing devices of claim 5, wherein the storage area includes at least one of a hard disk and non-volatile memory in data communication with the printing device.

7. The system for network-based uploading of drivers for document processing devices of claim 5 wherein the means adapted for commencing transfer of the at least one of the plurality of software drivers to the storage area includes means adapted for commencing transfer automatically once the user selectively directs loading of the at least one of the plurality of software drivers to the associated storage area.

8. The system for network-based uploading of drivers for document processing devices of claim 5, wherein the means adapted for commencing transfer of the at least one of the plurality of software drivers to the storage area includes means adapted for receiving user input to commence transfer once the user selectively directs loading of the at least one of the plurality of software drivers to the associated storage area.

9. A method for network-based uploading of drivers for document processing devices comprising the steps of:

selectively receiving into a memory integrated with a document processing controller, a plurality of alternative software drivers for use with associated workstations in data communication with a document processing device associated with the controller;

storing at least one executable software installation utility, the at least one executable software installation utility corresponding to at least one of the plurality of software drivers in the memory transmitted from the document processing controller;

receiving a document rendering request from at least one of the associated workstations, the document rendering request including commencement of a transfer of an associated electronic document from the at least one workstation to the document processing device;

determining a presence of a plurality of software drivers disposed in the memory, via the controller, that correspond to a received document rendering request, which plurality of software drivers are associated with different operating systems;

generating, via the controller, a graphical user interface on the associated workstations in accordance with a determined presence of a plurality of software drivers, which graphical user interface includes a list of each of the plurality of available software drivers corresponding to at least one document processing device;

receiving user in put, via the graphical user interface, which user input includes operating system data representative of an operating system type on the at least one associated workstation;

receiving user input, via the graphical user interface, which user input selectively directs loading of the at least one of the plurality of software drivers to a storage area associated with a document processing operation function of the at least one document processing device in accordance with received operating system data;

identifying at least one stored executable software installation utility stored in the memory which corresponds to the at least one of the plurality of software drivers corresponding to received user input;

commencing, in accordance with user input, a transfer of software from the memory to the storage area via a data communication session initiated via the graphical user interface in accordance with a selection completed via the user input, the software including at least one of the plurality of software drivers and at least one identified executable software installation utility corresponding to the at least one of the plurality of software drivers; and commencing operation of the at least one identified executable software installation utility on the associated workstation after transfer thereof to the storage area so as to install the at least one of the plurality of software drivers thereon.

10. The method for network-based uploading of drivers for document processing devices of claim 9 further comprising:

generating a graphical user interface on the associated workstations, which graphical user interface includes data representative of an alternative software driver to the at least one of the plurality of available software drivers, which alternative software driver is stored in the memory; and receiving user input, via the graphical user interface, which user inputs selectively directs loading of the alternative software driver to a storage area on the associated workstation.

11. The method for network-based uploading of drivers for document processing devices of claim 10 wherein the alternative software driver is one that was previously loaded on the software workstation so as to facilitate selective rollback to an earlier driver version.

12. The method for network-based uploading of drivers for document processing devices of claim 9 further comprising the step of initiating generation of the user interface upon a loading of the at least one of the plurality of available software drivers into the memory associated with the document processing controller.

13. The method for network-based uploading of drivers for document processing devices of claim 9, wherein the document processing device includes a printer, and wherein the software driver is comprised of a printer driver.

14. The method for network-based uploading of drivers for document processing devices of claim 13, wherein the storage area includes a hard disk in data communication with the printer.

15. The method for network-based uploading of drivers for document processing devices of claim 9, wherein the step of commencing transfer of the at least one of the plurality of software drivers to the storage area is initiated automatically once the user selectively directs loading of the at least one of the plurality of software drivers to the associated storage area.

16. The method for network-based uploading of drivers for document processing devices of claim 9, wherein the step of commencing transfer of the at least one of the plurality of software drivers to the storage area is initiated upon receipt of user input to commence transfer once the user selectively directs loading of the at least one of the plurality of software drivers to the associated storage area.

17. A system for providing device software from a network, wherein the network comprises at least one client machine and at least one network peripheral device in data communication, comprising:
    means adapted for transmitting communications between the at least one client machine and the at least one network peripheral device;
    rendering request means adapted for receiving a document rendering request from at least one network peripheral, the document rendering request including commencement of a transfer of an associated electronic document from the at least one network peripheral to the client machine;
    means adapted for determining a presence of a plurality of components of device software disposed in the memory means of the controller that correspond to a received document rendering request, which plurality of components of device software are associated with different operating systems;
    graphical user interface generation means including means adapted for generating, via the controller, a graphical user interface in accordance with a determined presence of a plurality of components of device software, which graphical user interface includes a list of a plurality of components corresponding to available device software, wherein the plurality of components of device software includes at least one executable software installation utility, the at least one executable software installation utility corresponding to at least one of the plurality of device components;
    means adapted for receiving user input, via the graphical user interface, which user input includes operating system data representative of an operating system type on the at least one associated workstation;
    input means adapted for receiving user input from a user associated with the at least one client machine, via the graphical user interface, which user input selectively directs loading of at least one of the plurality of components of the device software in accordance with received operating system data and identifies at least one executable software installation utility which corresponds to the at least one of the plurality of components of the device software to a storage area associated with the client machine in accordance with received operating system data;
    means adapted for downloading, in accordance with user input, the at least one of the plurality of components of the device software and at least one identified executable software installation utility from the at least one network peripheral to the storage area associated with the client machine via a data communication initiated via the graphical user interface in accordance with a selection completed via the input means; and
    means adapted for commencing operation of the at least one software installation utility on the client machine after transfer thereof to the storage area so as to install the at least one of the plurality of components of the device software thereon.

18. The system for providing device software from a network of claim 17 wherein:
    the graphical user interface generation means further includes means adapted for generating a graphical user interface on the client machine, which graphical user interface includes data representative of alternative component of the device software to the at least one of the plurality of components corresponding to the available device software; and
    the input means includes means adapted for receiving user input, via the graphical user interface, which user inputs selectively directs loading of the alternative component.

19. The system for providing device software from a network of claim 18 wherein the alternative component is one that was previously loaded so as to facilitate selective rollback to an earlier version.

20. The system for network-based uploading of drivers for document processing devices of claim 17 further comprising means adapted for initiating generation of the user interface upon a loading of the at least one of the plurality of components.

21. The system for providing device software from a network of claim 17, wherein the at least one network peripheral is a document processing device, and wherein the at least one of the plurality of components which is downloaded includes a driver for the document processing device.

22. The system for from a network of claim 17, wherein means adapted for downloading the at least one of the plurality of components of the device software includes means adapted for automatically commencing the downloading once the user selects the at least one of the plurality of components.

23. The system for from a network of claim 17, wherein the means adapted for receiving user input includes means adapted for receiving user input to commence downloading the at least one of the plurality of components of the device software.

24. A method for providing device software from a network, wherein the network comprises at least one client machine and at least one network peripheral device in data communication, comprising the steps of:
    transmitting communications between at least one client machine and at least one network peripheral device;
    receiving a document rendering request from at least one network peripheral, the document rendering request including commencement of a transfer of an associated electronic document from the at least one network peripheral to the client machine;

determining a presence of a plurality of components of device software disposed in the memory means that correspond to a received document rendering request, which plurality of components of device software are associated with different operating systems generating, via the controller, a graphical user interface in accordance with a determined presence of a plurality of components of device software, which graphical user interface includes a list of each of a plurality of components corresponding to available device software, wherein the plurality of components of device software includes at least one executable software installation utility, the at least one executable software installation utility corresponding to at least one of the plurality of device components;

receiving user input, via the graphic user interface, which user input includes operating system data representative of an operating system type on the at least one associated workstation;

receiving user input from a user associated with the at least one client machine, via the graphical user interface, which user input selectively directs loading of at least one of the plurality of components of the device software in accordance with received operating system data and identifies at least one executable software installation utility which corresponds to the at least one of the plurality of components of the device software to a storage area associated with the client machine;

downloading, in accordance with the user input, the at least one of the plurality of components of the device software from the at least one network peripheral to the storage area associated with the client machine, and at least one identified executable software installation utility via a data communication initiated via the graphical user interface in accordance with a selection completed via the input means in accordance with received operating system data; and commencing operation of the at least one identified executable software installation utility on the client machine after transfer thereof to the storage area so as to install the at least one of the plurality of components of the device software thereon.

25. The method for providing device software from a network of claim 24 further comprising the steps of:

generating a graphical user interface on the client machine, which graphical user interface includes data representative of an alternative component of the device software to the at least one of the plurality of components of the available device software; and receiving user input, via the graphical user interface, which user inputs directs loading of the alternative component.

26. The method for providing device software from a network of claim 25 wherein the alternative component is one that was previously loaded so as to facilitate selective rollback to an earlier version.

27. The method for network-based uploading of drivers for document processing devices of claim 24 further comprising the step of initiating generation of the user interface upon a loading of the at least one of the plurality of components.

28. The method for providing device software from a network of claim 24, wherein the at least one network peripheral is a document processing device, and wherein the at least one of the plurality of components which is downloaded includes a driver for the document processing device.

29. The method for from a network of claim 24, wherein the step of downloading the at least one of the plurality of components of the device software is automatically initiated once the user selects the at least one of the plurality of components.

30. The method for from a network of claim 24, wherein the step of downloading the at least one of the plurality of components of the device software is initiated upon receipt of user input to commence the downloading step.

* * * * *